April 5, 1960  F. VERES  2,931,142

GLASS-TO-GLASS SEAL

Filed April 20, 1956

INVENTOR
FRANK VERES
BY Rule and Hoye
ATTORNEYS

United States Patent Office 2,931,142
Patented Apr. 5, 1960

2,931,142

GLASS-TO-GLASS SEAL

Frank Veres, Toledo, Ohio, assignor to Owens-Illinois Glass Company, a corporation of Illinois Application April 20, 1956, Serial No. 579,548

2 Claims. (Cl. 49—92)

My invention relates to a hermetic glass-to-glass seal. The invention is of use, for example, in sealing together the parts of vacuumized glass tubes or envelopes. In this operation the parts may be sealed by means of a frit applied to the sealing edges. It is sometimes desirable to use a frit having a much lower melting or softening point than the parts to be sealed. Such a frit has an unavoidably high thermal expansion, much higher than that of the parts which are to be sealed together. This wide difference in the thermal expansion results in the failure of the seal.

An object of the present invention is to provide a glass-to-glass seal in which this difficulty is overcome, permitting the use of a sealing glass or frit having a relatively low softening temperature. In accordance with my invention one or more coatings of glass frit or frits, having a thermal expansion or expansions intermediate between that of the low melting frit and the parts to be sealed, are interposed between such low melting frit and the body of glass. In this manner a reliable hermetic seal is obtained.

Referring to the accompanying drawings.

Figure 1:
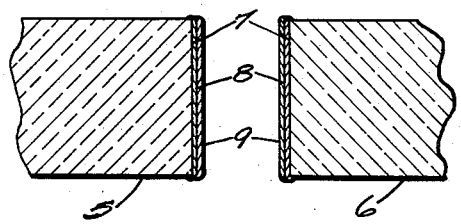
Fig. 1 is a diagrammatic sectional view of glass parts which are to be sealed together, with the sealing material applied to the sealing edges or surfaces.

Referring to Fig. 1, the glass bodies or parts 5 and 6 have applied to their surfaces 7, which are to be sealed together, a coating or layer of a glass frit 8 covering the surfaces 7. A coating or layer 9 of a low melting frit overlies and covers the frit 8. The intermediate layer 8 is hermetically sealed to the outer layer 9 and also to the glass body 5 or 6 to form an integrated structure or unit. These units, namely, the glass parts 5 and 6 with their frit coatings thereon, may be sealed together by heating the frit coatings to a temperature at which the frit 9 is softened, and then bringing the parts together to make a vacuum-tight seal.

The intermediate frit 8 has a coefficient of expansion intermediate that of the glass body 5 or 6 and the sealing frit 9. For example, the parent glass parts 5 and 6 may have a thermal expansion of $101 \times 10^{-7}$ per degree C. and the low melting frit 9, which hermetically seals the parts 5 and 6 together, may have a thermal expansion of $110 \times 10^{-7}$ per degree C. To permit the use of this low melting frit 9 the parent glass parts 5 and 6 are coated with the frit 8 having, for example, a thermal expansion of approximately $105 \times 10^{-7}$ per degree C. After the intermediate coating 8 is applied and sealed to the base glass the frit 9 is applied over the frit 8 and sealed thereto.

A further example, in which the base glass 5,6 may have a comparatively low coefficient of expansion, is as follows, the base glass 5,6 may have a coefficient of expansion of $90 \times 10^{-7}$ per degree C.

The intermediate solder glass or frit 8 may have, for example, the following composition:

| | Percent |
|---|---|
| PbO | 70 |
| $B_2O_3$ | 21 |
| ZnO | 9 |

This composition has a thermal expansion of approximately $96 \times 10^{-7}$ per degree C. and a softening point of about 840° F.

The frit 9 may have substantially the following formula:

| | Percent |
|---|---|
| PbO | 71.1 |
| $B_2O_3$ | 15.40 |
| ZnO | 9.47 |
| CuO | 1.88 |
| $SiO_2$ | 2.08 |

This frit has a softening point of 770° F. and thermal expansion of $102 \times 10^{-7}$ per degree C.

Figure 2:
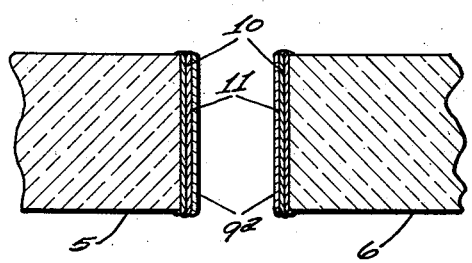
Fig. 2 is a similar view showing a modification in which a plurality of intermediate coatings or layers of glass frits are provided.

Fig. 2 illustrates a modification in which a plurality of coatings or layers 10 and 11 are applied intermediate the parent glass and the comparatively high expansion low melting frit 9a. As an example of this combination the parent glass 5—6 may have an expansion $101 \times 10^{-7}$ per degree C. and be coated with frit 10 having an expansion of $104 \times 10^{-7}$ per degree C.; the frit 10 may be coated with the frit 11 having thermal expansion $107 \times 10^{-7}$ per degree C.; and finally the frit 11 may be coated with the low melting frit 9a having a coefficient of expansion of $110 \times 10^{-7}$ per degree C.

The invention is adapted for use generally for sealing glass parts where it is desirable to use a sealing frit or glass solder having a substantially lower softening point than the parent glass and a higher coefficient of expansion such that it is impractical or impossible to make a reliable hermetic seal directly between such parts. The formulae above given are by way of example and not as indicating the limitations of the invention.

Accordingly, modifications may be resorted to within the spirit and scope of the invention.

I claim:

1. A glass body formed with a sealing surface, superposed thin layers of glass frit covering said surface, said layers including an intermediate layer having substantially the following composition:

| | Percent |
|---|---|
| PbO | 70 |
| $B_2O_3$ | 21 |
| ZnO | 9 | and an outer layer having substantially the following composition:

| | Percent |
|---|---|
| PbO | 71.1 |
| $B_2O_3$ | 15.40 |
| ZnO | 9.47 |
| CuO | 1.88 |
| $SiO_2$ | 2.08 | said glass body having a coefficient of expansion of about $90 \times 10^{-7}$ per degree C., said intermediate layer having a coefficient of expansion of about $96 \times 10^{-7}$ per degree C. and said outer layer having a coefficient of expansion of about $102 \times 10^{-7}$ per degree C.

2. An article of manufacture comprising two glass bodies, each of said bodies having a sealing surface, a superposed, thin, first layer of glass frit covering each of said sealing surfaces, said layer having substantially the following composition:

| | Percent |
|---|---|
| PbO | 70 |
| $B_2O_3$ | 21 |
| ZnO | 9 | and a second thin layer of glass frit superposed and fused between said first layers and having substantially the following composition:

| | Percent |
|---|---|
| PbO | 71.1 |
| $B_2O_3$ | 15.40 |
| ZnO | 9.47 |
| CuO | 1.88 |
| $SiO_2$ | 2.08 | each of said glass bodies having a coefficient of expansion of about $90 \times 10^{-7}$ per degree C., said first layers having a coefficient of expansion of about $96 \times 10^{-7}$ per degree C. and said second layer having a coefficient of expansion of about $102 \times 10^{-7}$ per degree C.

References Cited in the file of this patent
UNITED STATES PATENTS

| 1,960,121 | Moulton | May 22, 1934 |
| 2,248,644 | Reger et al. | July 8, 1941 |
| 2,305,683 | Engels | Dec. 22, 1942 |
| 2,494,582 | Prokopec | Jan. 17, 1950 |
| 2,517,019 | Nordberg | Aug. 1, 1950 |
| 2,749,668 | Chaffotte et al. | June 12, 1956 |